United States Patent [19]

Stanley et al.

[11] Patent Number: 5,082,246
[45] Date of Patent: Jan. 21, 1992

[54] GAS BALL VALVE

[75] Inventors: M. Dale Stanley, Stonington; Robert D. Brownlow; John R. Rice, both of Decatur; Robert E. Sands, Shelbyville, all of Ill.

[73] Assignee: Mueller Co., Decatur, Ill.

[21] Appl. No.: 667,300

[22] Filed: Mar. 12, 1991

[51] Int. Cl.⁵ .............................................. F16K 5/06
[52] U.S. Cl. ..................................... 251/315; 251/214
[58] Field of Search ................ 251/214, 304, 309, 315

[56] References Cited

U.S. PATENT DOCUMENTS

| | | | |
|---|---|---|---|
| 3,425,663 | 2/1969 | Priese | 251/315 X |
| 3,458,172 | 7/1969 | Burrows | 251/315 X |
| 3,554,218 | 1/1971 | Smith . | |
| 3,557,832 | 1/1971 | Mueller . | |
| 4,546,790 | 10/1985 | Huber et al. | 251/315 X |
| 4,667,928 | 5/1987 | Davatz et al. | 251/315 |
| 4,984,767 | 1/1991 | Daghe . | |

Primary Examiner—John C. Fox
Attorney, Agent, or Firm—Cushman, Darby & Cushman

[57] ABSTRACT

The present invention provides a valve assembly having a bore fitted with an operating member, whereby the operating member operatively controls a valve member to permit or prevent fluid flow through the valve assembly. The bore extends along a longitudinal axis and has a selected diameter in one portion and a diameter greater than the selected diameter on an interior portion. The bore further includes an annular transition portion extending with diminishing diameter from the interior portion to the one portion of the bore. The operating member is substantially cylindrical and includes a first portion which closely interfits with the one portion of the bore and a second portion which has an annular convex surface disposed to face the transition portion of the bore. The annular convex surface of the operating member and the transition portion of the bore form a metal-to-metal seat which performs desirably in a high temperature environment. The valve member is disposed in a valve housing between two rubber sealing rings. The rubber rings are disposed in recesses partially defined by annular lips. When the valve assembly is exposed to high temperature, the rubber rings burn and char away sufficiently and the valve member engages one of the annular lips to form a metal-to-metal seat to limit any leakage.

46 Claims, 4 Drawing Sheets

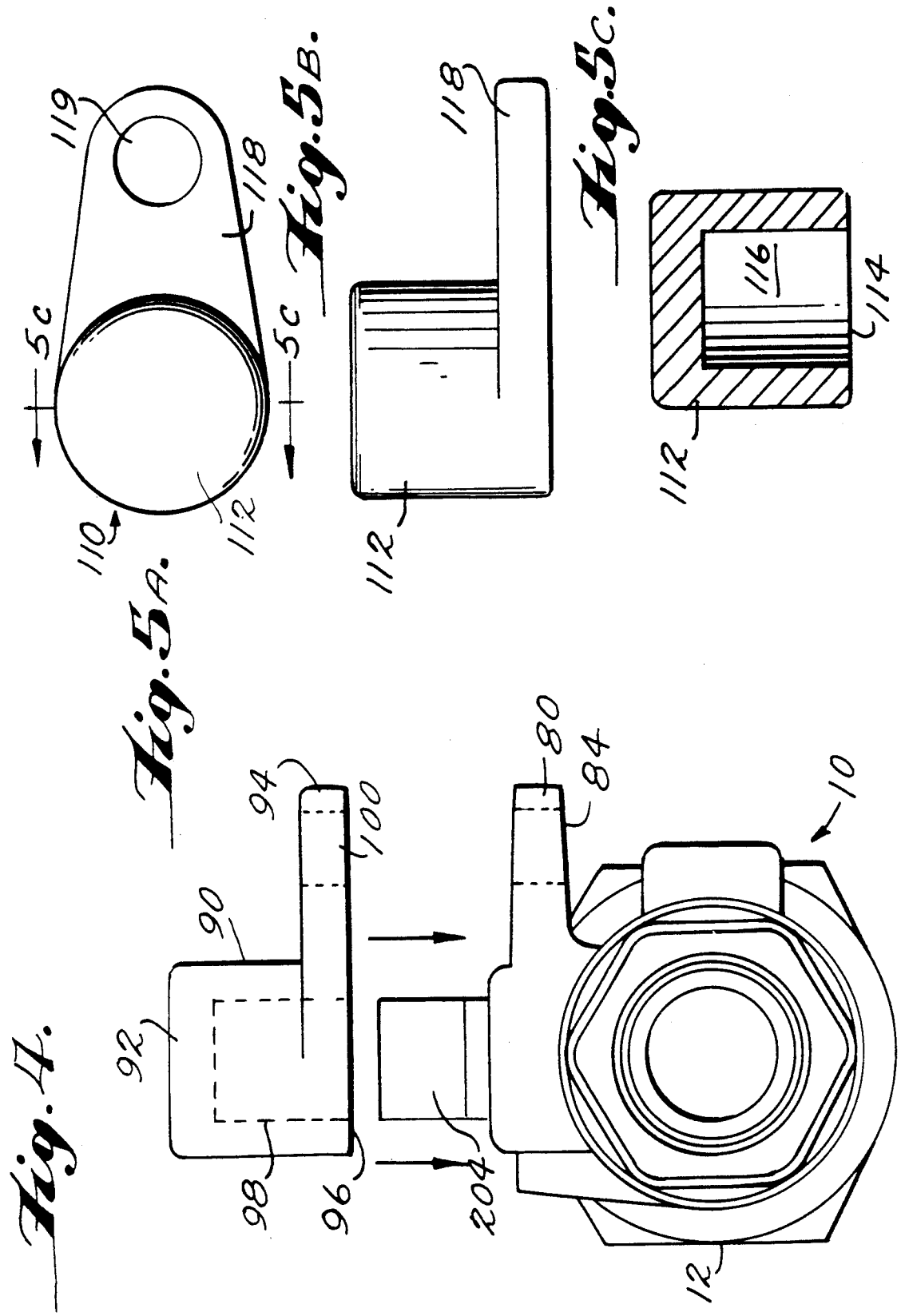

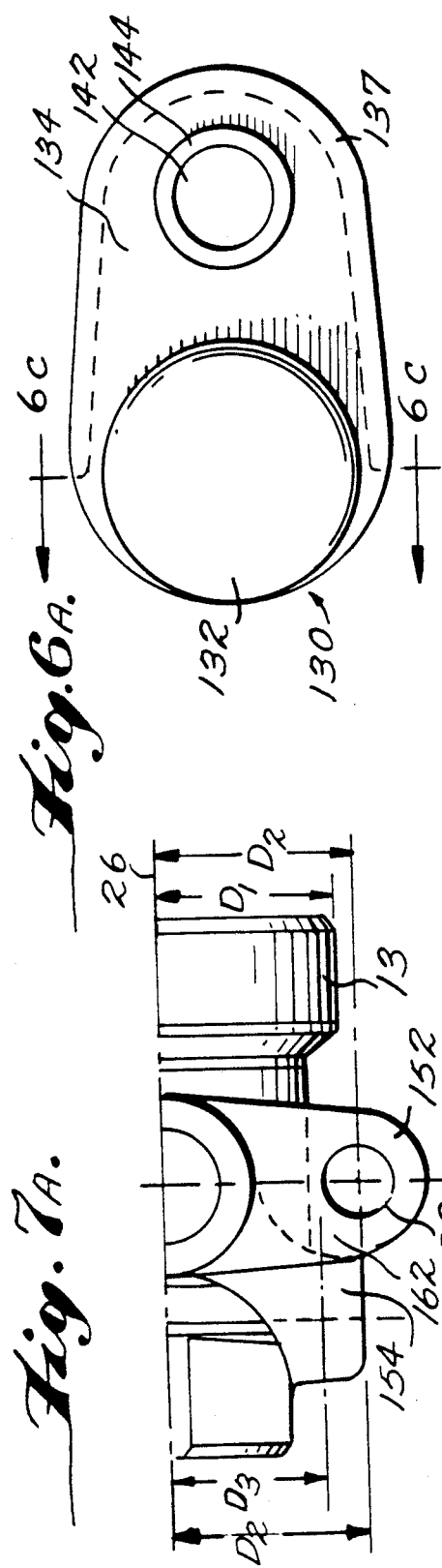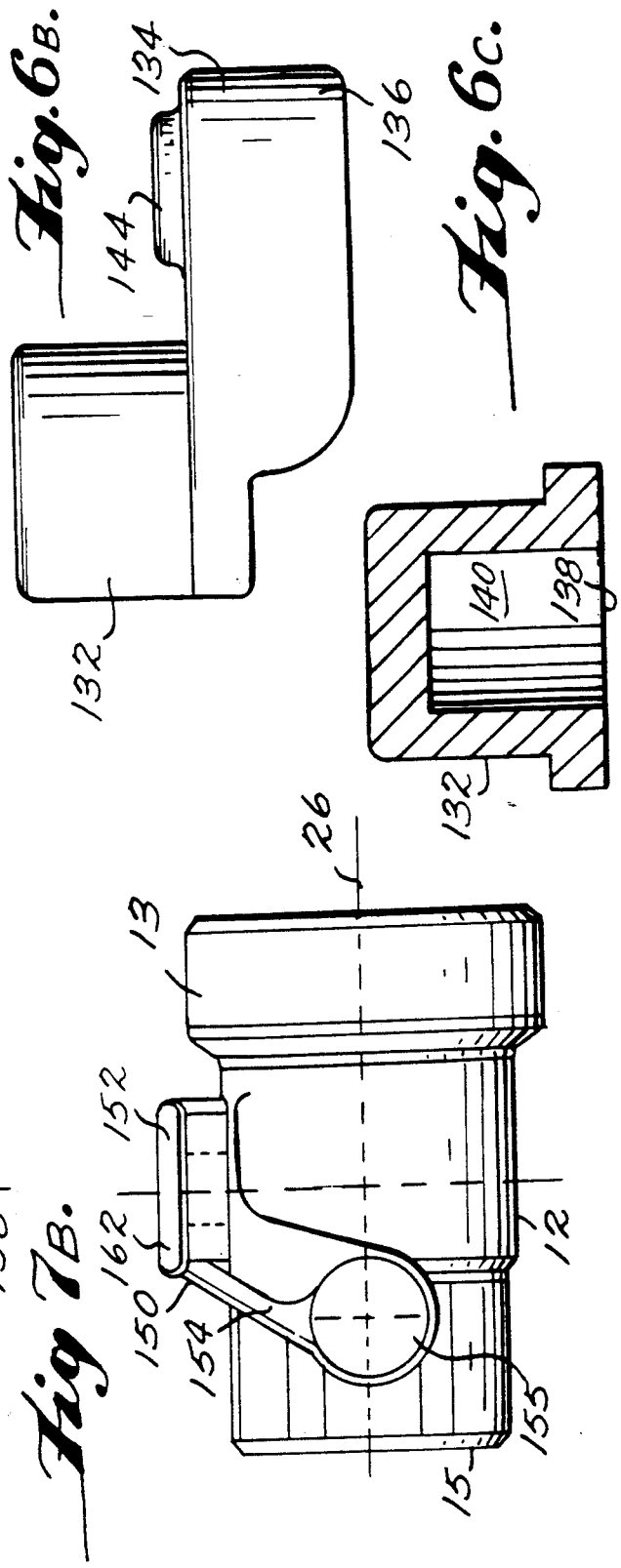

GAS BALL VALVE

BACKGROUND OF THE INVENTION

1. Field of the Invention

The present invention relates to a gas ball valve, and more particularly to a gas ball valve which maintains a seal under high temperatures.

2. Background of the Art

There are two general types of gas service line valves: a metal-to-metal seated valve and a soft seated valve. The metal-to-metal seated valve provides a metal against metal seal by means of lubricant and/or sealant. Unfortunately, the metal-to-metal seated valve requires periodic maintenance to ensure a tight seal and low turning torque. In contrast, the soft seated valve provides a resilient material against metal seal. Although the soft seated valve is relatively maintenance free and provides a lower turning torque, it has a disadvantage in that it fails to function properly in a high temperature environment because the resilient material does not maintain its sealing integrity in high temperatures.

There is an increasing demand for a gas line ball valve which has the advantages of a soft seated arrangement (i.e., low maintenance and easy turning) and is capable of functioning properly in a high temperature environment (such as a fire) as provided for by the requirements of the American Petroleum Institute (API) No. 607. In a high temperature environment, it is important that the gas ball valve be easily turned off to prevent further flow of gas into that environment. Moreover, once the valve is off, it is critical that the valve maintain a minimum seal as defined by API 607 which presently is the only national standard used to evaluate the fire resistance of a valve. Gas industry expectations also may include sealability at pressures less than those used in API 607. Such a valve would have a number of applications including use for gas distribution to residential and business establishments, and use in petrochemical and refinery plants.

Legal regulations prevent the use of soft seated valves it the valves ability to control a flow of gas is adversely effected by exposure to anticipated heat, which may include a fire (see, for example, 49 CFR 192.363). Recent interpretations by OPS have relied upon API 607 as the standard to be used to demonstrate resistance to anticipated heat. With the API 607 standard, one must employ tests for leakage at a pressure that is 75% of the valve pressure rating.

Previous soft seated valves were incapable of operating in a high temperature environment because the resilient material (such as rubber) tended to melt or deform, thereby permitting gas to leak through the seal. Therefore, valves employed in high temperature environments exclusively used seals made of heat resistant materials, such as polytetrafluoroethylene resins, a material that is typically harder than common rubber seals. Such high temperature seals are relatively expensive. Although these high temperature seals performed adequately under temperatures up to 600° F., the seals had a disadvantage in that they did not always perform well at low gas pressures (at some pressure less than the 75% of the valve pressure rating API 607). In other words, the high temperature seals performed satisfactorily during the high temperature tests because the tests are performed at line pressures of 75% of rated pressure; but, the high temperatures seals were sometimes found to leak at low line pressures. In practice, line pressures may be very low, particularly when the valve is used on a service line to a residential or business establishment. Therefore, the valves employing high temperature seals are not well suited to perform in all environments and at all line pressures. Specifically, a valve in actual practice may be subjected to a lower temperature than that set forth in API 607 and/or to a lesser pressure than 75% of the valve rated pressure. If the high temperature seal does not fully melt when heated and/or if the pressure is not sufficient to fully deform the high temperature seal so as to move the seal out of the closing path of the valve, a valve may fail to meet the API 607 standard.

Another disadvantage of conventional gas valves is the expense of manufacturing. One expense is the added cost of using high temperature seals. Another expense is that conventional gas valves have caps which are permanently fixed to the valve stem. These caps are used to operate the valve and may be secured to prevent someone from turning the gas on or off without authorization. Unfortunately, the cost to manufacture these caps is a considerable percentage of the cost to manufacture the entire valve. Therefore, providing a cap for each valve significantly increases the per unit cost of each valve.

Another problem encountered by conventional gas valves is vandalism or theft. Conventional fixed caps are usually made from a soft brass or other non-hardened material which is ideal for the operating mechanism of the valve. The softer materials, however, can be easily cut with a hacksaw or the like, thereby permitting vandals or thieves to tamper with the gas valve.

SUMMARY OF THE INVENTION

An object of the present invention is to provide a soft seated valve which operates effectively in a high temperature environment and to meet the API 607 standard.

Another object of the present invention is to provide a soft seated valve which operates effectively in a high temperature environment and at all pressure levels up to the rated pressure.

Another object of the present invention is to provide a soft seated valve which operates effectively in a high temperature environment and at all pressure levels, yet is still economically feasible to manufacture.

To achieve these objects, the present invention provides the valve assembly which has a bore fitted with an operating member, whereby the operating member operatively controls a valve member to permit or prevent fluid flow through the valve assembly. The bore extends along a longitudinal axis and has a selected diameter in one portion and a diameter greater than the selected diameter in an interior portion. The bore further includes an annular transition portion extending with diminishing diameter from the interior portion to the one portion of the bore. The operating member is substantially cylindrical and includes a first portion which closely interfits with the one portion of the bore and a second portion which has an annular convex surface disposed to face the transition portion of the bore. The annular convex surface of the operating member and the transition portion of the bore form a metal-to-metal seal which performs reliably in a high temperature environment as determined by API 607.

The valve member is disposed in a valve housing between two resilient sealing rings. One ring is disposed in a recess in the interior of the valve housing and a second ring is disposed in a recess of an insert fitting fixed in one end of the valve housing. The recesses are partially defined by annular lips which operate to hold the rings in place. The rings sealingly engage both sides of the valve member.

According to the present invention, the rings are formed of rubber, which provides three advantages. First, the rubber ring operates well at all pressure levels, including low pressure levels as well as at all temperatures up to the API 607 test conditions. Second, when the valve is exposed to a high temperature environment, the rubber ring sufficiently burns and chars to permit the valve member to seat against one of the annular lips, thereby forming a metal-to-metal seal in the fluid passage of the valve assembly. Third, rubber is considerably less expensive than the conventional high temperature materials, thereby reducing the unit cost of the valve assemblies.

Therefore, the present invention provides a gas valve which has the advantages of a soft seated arrangement and is capable of functioning properly in a high temperature environment. Moreover, the present invention provides these features for very low manufacturing costs.

Another object of the present invention is to provide a portable cap which will further reduce the cost of a valve by eliminating the need for a permanently fixed cap on each valve system.

Yet another object of the present invention is to provide a valve and cap arrangement which is tamper proof.

To achieve these objects, the present invention provides a removably mounted cap which covers the exposed portion of the operating member of the valve assembly. The cap has a body with a hollow interior formed to fit over any position of the operating member and a tongue which protrudes laterally from the body. The tongue has a hole formed therein. When the body of the cap is placed over the operating member, the tongue lies adjacent a securing arm formed on the valve housing. The securing arm also has a hole formed therein. A pad lock, pin lock, or the like, may then be inserted through the holes in the tongue and securing arm to lock the portable cap onto the valve housing. Because only a small portion of valves are ever locked off (for example, locking off a residence due to delinquent payments), only a small number of portable caps need to be purchased by gas companies. Accordingly, the portable cap effectively reduces cost of a valve assembly because each assembly no longer requires a permanent fixed cap. A further advantage of the portable cap is that it provides for locking the valve in the open position where such is required such as in front of a pressure relief valve.

In another embodiment of the present invention, the portable cap further includes a protective edging which extends at a 90° angle from the periphery of the tongue. A protective edging surrounds the securing arm of the valve housing to prevent a vandal or thief from using a hacksaw to cut the softer securing arm of the valve housing. The cap is formed of a hardened material which is difficult to cut or break.

In another embodiment of the present invention, the securing arm of the valve housing is provided with a tongue portion and a webbing portion. The webbing portion defines a circular region which may be adapted for a service boss. The webbing portion extends from the circular region to the tongue and conforms to the cylindrical shape of the valve housing. This webbing portion, in combination with the shape of the valve housing, prevents the insertion of prying tools or the use of hacksaws in attempts to tamper with the valve assembly.

BRIEF DESCRIPTION OF THE DRAWINGS

These and other advantages of the present invention will become more apparent from the detailed description of the preferred embodiments along with the following drawings:

FIG. 4 shows the use of a portable cap with the valve assembly;

FIGS. 5A-5C show a first embodiment of a portable cap according to the present invention;

FIGS. 6A-6C show a second embodiment of a portable cap according to the present invention; and FIGS. 7A-7B show an embodiment of a valve housing having a special securing arm which prevents theft or vandalism.

DESCRIPTION OF THE PREFERRED EMBODIMENT

Figure 1:
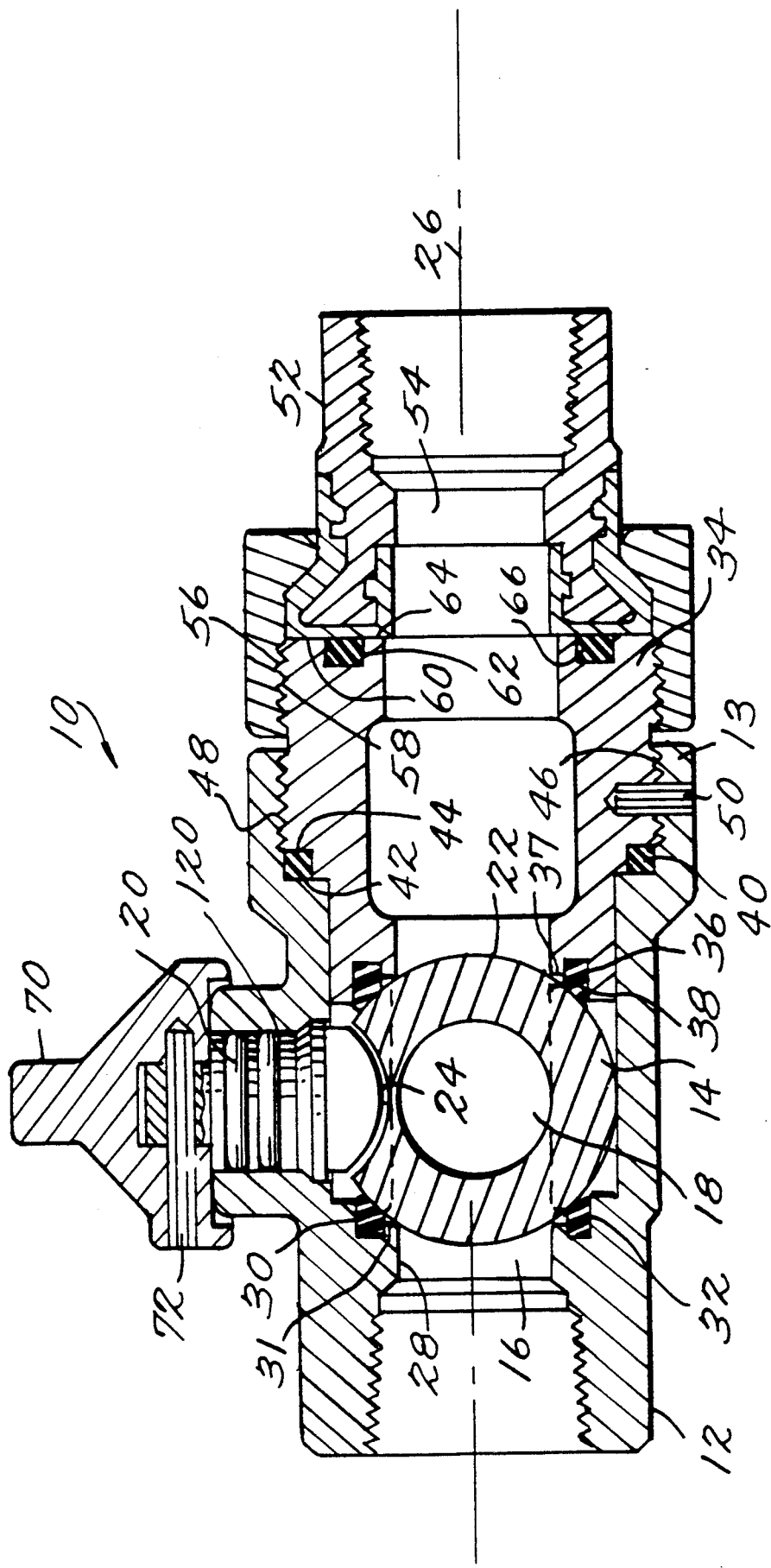
FIG. 1 shows a cross-sectional view of a valve assembly according to the present invention.

FIG. 1 shows a valve assembly 10 having a valve housing 12, a valve member 14 and a valve stem or operating member 20. The valve housing 12 is made of a cast metal and has a fluid passage 16 which, depending upon the position of the valve member 14, permits fluid to pass through under pressure. The valve member 14 is a steel ball shaped element having a through bore 18, an exterior surface 22 and a recess 24. The valve member 14 is rotatably disposed in the fluid passage 16 to be movable between an open position wherein fluid flows through the fluid passage 16 and the through bore 18, and a closed position wherein fluid is prevented from flowing through the fluid passage 16 and the through bore 18. The operating member 20 engages the recess 24 of the valve member 14 to rotate the valve member 14 between the open position and the closed position. FIG. 1 shows the valve member 14 in the closed position. The operating member 20 will be described in more detail with reference to FIG. 2.

The valve housing 12 extends along a longitudinal axis 26, and the fluid passage 16 extends substantially parallel to the longitudinal axis 26. The fluid passage 16 is defined by an interior surface 28 of the valve housing 12. The interior surface 28 includes a recess 30 which is defined on one side by an annular lip 31. A resilient, compressible ring 32 is disposed in the recess 30 and is held therein by the annular lip 31 and the valve member 14. The ring 32 sealingly engages the exterior surface 22 of the valve member 14.

The valve assembly 10 further includes an insert fitting 34 which is adapted to be inserted into one end 13 of the valve housing 12. The fitting 34 has an annular recess 36 which is defined on one side by an annular lip 37. A second resilient, compressible ring 38 is disposed in the recess 36 and is held therein by the annular lip 37 and the valve member 14. The ring 38 sealingly engages the exterior surface 22 of the valve member 14.

Unlike conventional high temperature valves which employ seals made from high temperature materials (such as polytetrafluoroethylene resin), the rings 32 and 38 of the present invention are formed of rubber. Rubber rings have three advantages over the conventional high temperature rings. First, the rubber rings 32 and 38 operate reliably at all pressure levels, including low pressure levels. Conventional high temperature seals do not preform well at low pressure levels.

Second, when the valve is exposed to a high temperature environment, the rubber rings 32 and 38 sufficiently melt away. This permits the valve member 14 to sit against the annular lip 37, thereby forming a metal-to-metal seal in the fluid passage 16. The gas line pressure (from the left in FIG. 1) will keep the valve member 14 seated against the annular lip 37. In extreme heating conditions, the rubber ring 38 melts away entirely which is advantageous for forming the metal-to-metal seal as no remnants remain which could prevent rotation of the valve member 14. Conventional high temperature seals have often been found to melt or deform only partially under high temperatures. As a result, the valve member 14 could not fully engage the annular lip 31 to form a metal-to-metal seal. Thus, gas was permitted to escape.

A third advantage of using rubber rings is that rubber is considerably less expensive than the conventional high temperature seals. Therefore, the unit cost of the valve assemblies according to the present invention can be significantly less.

A seal 40 is disposed between an annular shoulder 42 of the interior surface 28 of the valve housing 12 and an annular shoulder 44 of fitting 34. The seal 40 can be made of an elastomer which expands during high temperature conditions or even the more common elastomeric o-ring seals can be used. Alternatively, the annular shoulder 44 may be formed to abut the annular shoulder 42 without a seal provided therebetween.

The fitting 34 is provided with threading 46 to threadably engage threading 48 of the valve housing 12. A securing pin 50 is inserted through the valve housing 12 and the fitting 34 to prevent any rotation of the fitting 34 within the valve housing 12. Although not shown in FIG. 1, the securing pin 50 may also be inserted through the threadings 46 and 48, in parallel to the longitudinal axis 26 (i.e., perpendicular to presently shown position of securing pin 50).

The valve assembly 10 may further include an end piece 52 which is a adapted to be connected to the fitting 34. The end piece 52 extends along the longitudinal axis 26 and has through bore 54. The nut 59 is provided with threading 56 to threadably engage threading 58 of the fitting 34.

The insert fitting 34 is formed with flat annular end surface 60 having an annular groove 62 formed therein. The end piece 52 has a flat annular shoulder 64 which abuts the end surface 60 of the insert fitting 34. A resilient compressible ring 66 is disposed in the annular groove 62 between the end surface 60 and the shoulder 64.

The valve assembly 10 further includes a fixed cap 70 which is permanently fixed to the operating member 20 by a securing pin 72.

To assemble the valve assembly 10, the rubber ring 32 is inserted into the recess 30. Then, the operating member 20 is placed through the fluid passage 16 into the bore 120. Next, the valve member 14 is placed through the fluid passage 16 into operative engagement with the operating member 20. The rubber ring 38 is then placed in the recess 36 of the fitting 34 and the fitting 34 is screwed into end 13 of the valve housing 12 to sealingly mount the valve member 14 between the two rubber rings 32 and 38.

Figure 2:
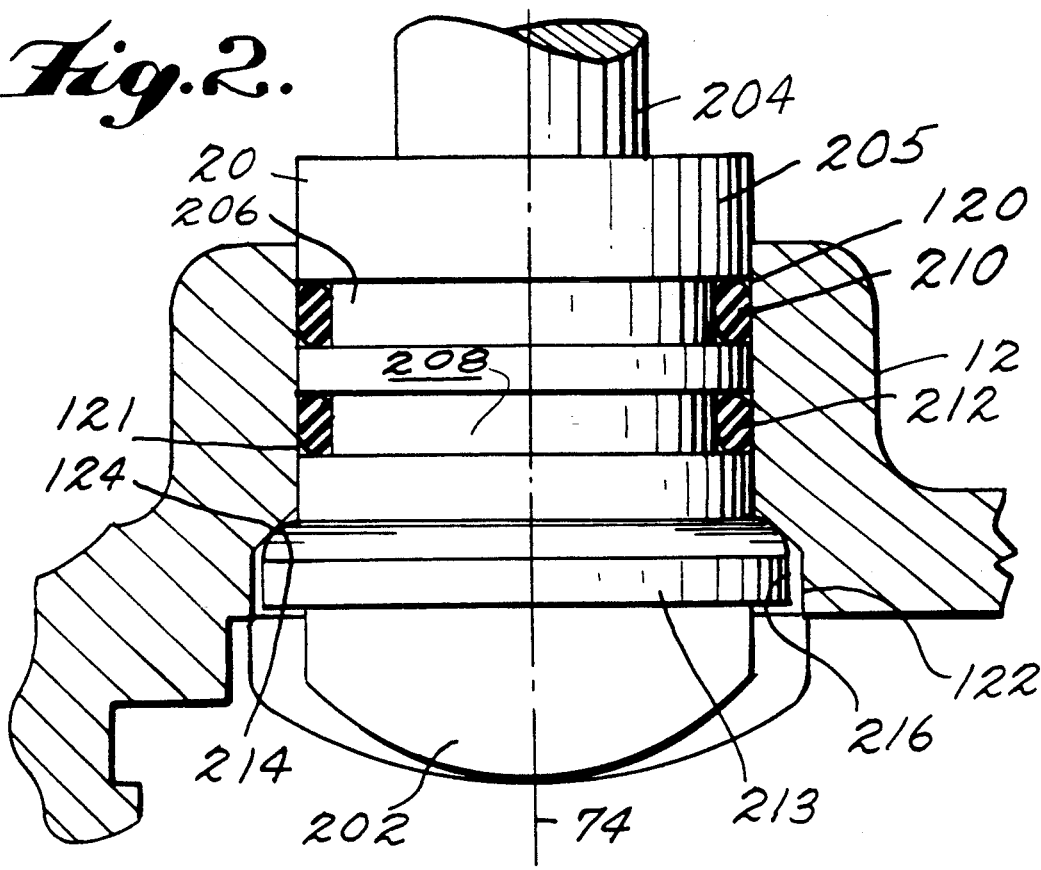
FIG. 2 shows a detailed view, partly in section, of an operating member employed in a valve assembly shown in FIG. 1.

A description of the operating member 20 will now be provided with reference to FIG. 2. The valve housing 12 has a bore 120 extending along a longitudinal axis 74 which is perpendicular to valve axis 26 in FIG. 1. The operating member 20, which is cylindrically shaped, is disposed within the bore 120. The operating member 20 has a rounded end 202 which engages the recess 24 of the valve member 14 (as shown in FIG. 1) and an opposite end 204. The operating member 20 includes a first portion 205 having two annular grooves 206 and 208 for respectively holding a dirt seal o-ring 210 and a leak seal o-ring 212. The o-rings 210 and 212 are formed of a resilient compressible material to sealingly engage the portion 121 of the bore 120. The operating member 20 further includes a second portion 213 of a larger diameter than the first portion 205. The second portion 213 has an annular convex surface 214 and an annular flat surface 216.

To accommodate the shape of the operating member 20, the bore 120 includes an interior portion 122 which has a diameter greater than that of the portion 121 of the bore 120. The bore 120 further includes an annular transition surface 124 which extends with diminishing diameter from the interior portion 122 to the portion 121 of the bore 120. The transition surface 124 is flat and extends at an angle to the longitudinal axis 74. Preferably, this angle is not less than 45°.

When assembled, the annular convex surface 214 of the operating member 20 is disposed to face or abut the transition surface 124 of the bore 120 and the flat surface 216 is disposed to face the interior portion 122. The interaction between the convex surface 214 and the transition surface 124 has three significant advantages.

First, when the valve assembly 10 is exposed to high temperatures, the convex surface 214 and the transition surface 124 effectively provide a metal-to-metal seal which will not be deformed and rendered useless by the high temperatures. Therefore, even though the o-rings 210 and 212 may leak or fail during exposure to high temperatures, the seal established between the convex surface 214 and the transition surface 124 minimizes gas leakage.

Second, the structure permits easy operation of the operating member 20 to open and close the valve member 411, after the valve assembly 10 has been in a high temperature environment such as that specified in API 607. The convex surface 214 on the flat transition surface 124 facilitates rotation of the operating member 20 about the longitudinal axis 74. A 45° angle between the transition surface 124 and the longitudinal axis 74 is preferred because testing has indicated that an angle less than 45° tends to allow the operating member 20 to become wedged in the bore 120, thereby inhibiting rotation.

Third, the operating member 20 may be manufactured at a low cost. Conventional high temperature gas valves employ a high temperature resistent packing material between the operating member and the bore. This packing material is expensive and significantly adds to the cost of the valve. The operating member 20 according to the present invention has a unique convex surface 214 which provides a metal-to-metal seal with the bore at a very low manufacturing cost. As a result, low cost material, such as rubber, may be used for the resilient o-rings 210 and 212 instead of the high cost, high temperature packing material.

The operating member 20 is preferably formed of ferrous material which could be stainless steel in those cases where corrosion is a factor. The inventors have recognized that when the operating member 20 was formed of brass, like conventional operating members, the diameter and shape of the second portion 213 could not withstand the intense heat. The second portion 213 of a brass operating member would soften and deform to the diameter of the first portion 205, and thus, the brass operating member could be forced out through the bore 120. A stainless steel operating member does not deform in a high temperature environment.

Figure 3:
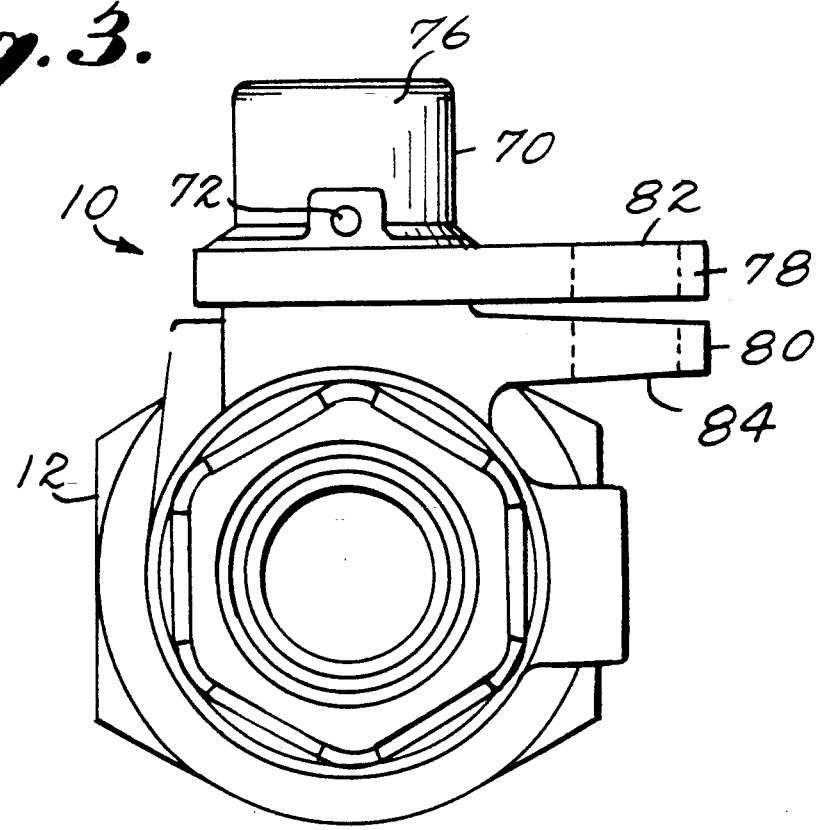
FIG. 3 shows an elevational view of a fixed cap on a valve assembly.

FIG. 3 shows a view in elevation of the valve assembly 10 shown in FIG. 1. The fixed cap 70 has a body 76 and a tongue 78, which protrudes from the body 76. The valve housing 12 includes a securing arm 80 which extends substantially parallel to the tongue 78 of the fixed cap 70. The tongue 78 has a hole 82 formed therein which may be aligned with a hole 84 formed in the securing arm 80. A locking device, such as a pad lock or pin lock (not shown), may be inserted through the holes 82 and 84 to lock the fixed cap 70 in a preselected position.

FIG. 4 shows another embodiment of the present invention wherein a portable cap 90 is used rather than the fixed cap 70. The portable cap 90 has a body 92 and a tongue 94. The body 92 is formed with a single opening 96 and a hollow interior 98 which permits the cap 90 to fit over the end 204 of the operating member 20. When the portable cap 90 is placed over the end 204 of the operating member 20, a hole 100 formed in the tongue 94 maybe aligned with the hole 84 in the securing arm 80. A padlock or pin lock may then be inserted through the holes 84 and 100 to lock the portable cap 90 onto the valve housing 12.

FIGS. 5 and 6 illustrate two different embodiments of the portable cap 90 according to the present invention. In FIGS. 5A-5C, the portable cap 110 includes a cylindrical body 112, having an opening 114 and a hollow interior 116, and a tongue 118. The hollow interior 116 is formed with sufficient dimensions to cover the end 204 of the operating member 20, regardless of the position of the operating member 20. The tongue 118 protrudes from the body 112 and has a hole 119 formed therein.

In FIGS. 6A-6C, a portable cap 130 comprises a cylindrical body 132, a tongue 134 and a protective edging portion 136. The body 132 includes an opening 138 and a hollow interior 140 which effectively fits over the end 204 of the operating member 20. The protective edging portion 136 extends at a 90° angle from the periphery 137 of the tongue 134. A hole 142 is formed in the tongue 134 and a ridge portion 144 extends upward from the tongue 134 and surrounds the hole 142.

The two embodiments shown in FIGS. 5 and 6 are formed of a hard metal which is difficult to cut with a hacksaw or other like tools.

According to the embodiment shown in FIGS. 6A-6C, when the portable cap 130 is placed on the valve assembly 10 over the operating member 20, the protective edging portion 136 surrounds the securing arm 80 of the valve housing 12. The protective edging portion 136 prevents a vandal or thief from cutting the securing arm 80, which may be formed of a softer material.

FIGS. 7A and 7B show another embodiment of the securing arm of the valve housing 12. A securing arm 150 includes a tongue portion 152 and a webbing portion 154. The tongue portion 152 extends along axis 160 in a direction substantially perpendicular to that of the longitudinal axis 26. The tongue 152 has a hole 158 formed therein to facilitate a padlock or pin lock.

The webbing portion 154 extends at an angle from a periphery 162 along one side of the tongue portion 152 toward the end 15 of the valve housing 12. The webbing portion 154 defines a circular region 155 which may be used as a service boss. The webbing portion 154 conforms to the curvature of the valve housing 12 as shown in FIG. 7A.

The valve housing 12 is formed with one end 13 having an exterior diameter larger than that of the end 15. As shown in FIG. 1, the end 13 is larger to facilitate the insertion of fitting 34. The combination of the end 13 and the webbing portion 154 extend predetermined distances $D_1$ and $D_2$ from the longitudinal axis 26 to protect the tongue 152 and the lock (not shown) inserted through the hole 158 and thereby prevent vandals or thieves from disturbing the gas valve. The distances $D_1$ and $D_2$ may be the same and are preferably between a distance $D_3$ (i.e., the distance from the longitudinal plane defining the longitudinal axis 26 to the edge of the hole 158) and a distance $D_4$ (i.e., the distance from the longitudinal plane defining the longitudinal axis 26 to the center of the hole 158). As shown in FIG. 7A, it is difficult to insert prying tools, or to use hacksaws and the like, to attack the locking device because of the protruding webbing 154 and the expanded end 13. The webbing portion 154 also strengthens the tongue portion 152 against foundry breakage during the "shakeout" from the mold during manufacturing.

The present invention therefore provides a soft seated gas valve which operates effectively in a high temperature environment and at all temperatures, yet is not expensive to manufacture. The present invention may be used for gas distribution to residential and businesses establishments, or in petrochemical and refinery plants. The present invention further provides a portable cap which helps reduce costs by eliminating the need for permanently fixed caps on every valve system. Finally, the present invention provides novel concepts for fighting vandalism and theft.

It is to be understood that the invention is not limited to the disclosed embodiment, but is intended to cover various modifications and equivalent arrangements included within the spirit and scope of the appended claims.

What is claimed is:

1. A valve assembly for carrying a fluid under pressure and comprising a valve housing having a fluid passage therethrough, a valve member rotatably disposed in said passage to be movable between an open position wherein flow through said passage and valve member is permitted and a closed position wherein flow through said passage and valve member is prevented, said valve housing having a bore of a selected diameter and extending along a longitudinal axis, an operating member disposed in said bore with one end thereof operatively engaging said valve member and an opposite end, said bore having an interior portion having a diameter greater than said selected diameter and an annular transition portion extending from said interior portion to said bore of selected diameter with diminishing diameter, said operating member being substantially cylindrical and having a selected length including a first portion having a diameter permitting said first portion to closely interfit with said bore of selected diameter and a second portion comprising an annular convex surface disposed to face said transition portion, said operating member including resilient sealing means for sealingly engaging said bore, said resilient sealing means being located between said opposite end and said second portion of said operating member.

2. The invention as claimed in claim 1 wherein said transition portion of said bore is a flat wall surface.

3. The invention as claimed in claim 2 wherein said flat wall surface extends at an angle to said longitudinal axis of said bore.

4. The invention as claimed in claim 3 wherein said angle is not less than 45°.

5. The invention as claimed in claim 1 wherein said valve member is a ball shaped element having a through bore and an exterior surface including a recess receiving said one end of said operating member.

6. The invention as claimed in claim 1 wherein said valve member is steel.

7. The invention as claimed in claim 1 wherein said valve housing and valve member are cast metal, said valve member comprising a ball member having a through bore, said passage including second resilient sealing means for sealingly engaging said ball member.

8. The invention as claimed in claim 7 wherein said valve housing extends along a longitudinal axis, said passage also extending substantially parallel to said longitudinal axis of said valve housing and being defined by an interior surface of said valve housing, said interior surface including a pair of spaced apart recesses, one of said recesses being located on one side of said ball member and the other located on the opposite side of said ball member, said second resilient sealing means comprising a pair of compressible rings with one each disposed in a said recess to sealingly engage the surface of said ball member on substantially opposite sides thereof.

9. The invention as claimed in claim 8 wherein said rings are rubber.

10. The invention as claimed in claim 1 wherein said operating member is stainless steel.

11. The invention as claimed in claim 1 wherein said valve housing extends along a longitudinal axis, said passage also extending substantially parallel to said longitudinal axis of said valve housing and being at least partially defined by an interior surface of said valve housing, said valve housing having open opposite ends, said valve assembly including an insert fitting having a through bore and inserted in one of said opposite ends, said insert fitting having one end provided with an annular recess, said interior surface including an annular recess extending about said longitudinal axis of said valve housing, each said recess having a compressible ring carried therein to sealingly engage the surface of said valve member on substantially opposite sides thereof.

12. The invention as claimed in claim 11 wherein each said annular recess is defined on one side by an annular lip.

13. The invention as claimed in claim 11 wherein each said ring is rubber.

14. The invention as claimed in claim 11 wherein said passage is formed with a counter-bore of reduced diameter extending from an annular shoulder adjacent said one of said opposite ends and said fitting including an annular shoulder, said valve assembly including a sealing member disposed between said shoulders.

15. The invention as claimed in claim 14 wherein said sealing ring is fire resistant material.

16. The invention as claimed in claim 11 wherein said passage is formed with a counter-bore of reduced diameter extending from an annular shoulder adjacent said one of said opposite ends and said fitting including an annular shoulder, said shoulders being abuttingly disposed.

17. The invention as claimed in claim 11 wherein said interior surface is provided with threading adjacent said one of said opposite ends of said valve housing to threadably engage threading on an exterior surface of said fitting.

18. The invention as claimed in claim 17, further comprising a securing pin for locking said fitting in said valve housing.

19. The invention as claimed in claim 11, wherein said assembly further comprises an end piece adapted to connect to said fitting.

20. The invention as claimed in claim 19, wherein said end piece extends along a longitudinal axis substantially parallel to the longitudinal axis of said valve housing and has a through bore.

21. The invention as claimed in claim 20 wherein said fitting includes a flat annular end surface having an annular groove formed therein, and said end piece includes an interior surface having a flat annular shoulder, said valve assembly including a sealing member disposed in said groove between said end surface and said shoulder.

22. The invention as claimed in claim 19 wherein said fitting is provided with threading on an exterior surface at one end to threadably engage threading provided on an interior surface of said end piece.

23. The invention as claimed in claim 1, wherein said second portion of said operating member further comprises an annular flat surface disposed to face said interior portion of said bore, said annular convex surface providing transition from said annular flat surface to said first portion of said operating member.

24. The invention as claimed in claim 1, further comprising a cap including a body having an opening at one end and an interior formed to fit over the opposite end of said operating member, and a protruding member protruding from said body, said protruding member having a hole formed therein.

25. The invention as claimed in claim 24, wherein said cap is secured to said opposite end of said operating member with a securing pin.

26. The invention as claimed in claim 24, wherein said valve housing has a securing arm with a hole formed therein, said protruding member of said cap and said securing arm of said valve housing being formed such that said holes may be at least partially aligned.

27. The invention as claimed in claim 26, further comprising means for fastening said cap to said valve housing by inserting said fastening means through said holes in said protruding member and said securing arm.

28. The invention as claimed in claim 26, wherein said cap further includes a protective edging portion extending at an angle from a periphery of said protruding member, such that said protective edging portion extends around said securing arm of said valve housing when said cap is fitted on said opposite end of said operating member.

29. The invention as claimed in claim 28, wherein said angle is approximately 90°.

30. The invention as claimed in claim 28, wherein said cap further includes a ridge portion extending from said protruding member in a direction opposite the extension of said protective edging, said ridge portion disposed along a periphery of said hole formed in said protruding member.

31. The invention as claimed in claim 26, wherein said securing arm comprises a protruding portion with the hole formed therein, and a webbing portion extending at an angle from a periphery of one side of said protruding portion, the webbing portion being formed to conform to a curvature of the valve housing.

32. The invention as claimed in claim 31, wherein said webbing portion defines a circular region adapted for a service boss.

33. A valve assembly for carrying a fluid under pressure and comprising a valve housing having a fluid passage therethrough, a valve member rotatably disposed in said passage to be movable between an open position wherein flow through said passage and valve member is permitted and a closed position wherein flow through said passage and valve member is prevented, said valve housing having a bore of a selected diameter and extending along a longitudinal axis, an operating member disposed in said bore with one end thereof operatively engaging said valve member and an opposite end, said bore having an interior portion having a diameter greater than said selected diameter and an annular transition portion extending from said interior portion to said bore of selected diameter with diminishing diameter, said operating member being substantially cylindrical and having a selected length including a first portion having a diameter permitting said first portion to closely interfit with said bore of selected diameter and a second portion comprising an annular convex surface disposed to face said transition portion, said operating member including resilient sealing means for sealingly engaging said bore, said resilient sealing means being located between said opposite end and said second portion of said operating member, said valve housing extending along a longitudinal axis, said passage also extending substantially parallel to said longitudinal axis of said valve housing and being defined by an interior surface of said valve housing, said interior surface including a pair of spaced apart recesses, each said recess being defined on one side by an annular lip, one of said recesses being located on one side of said valve member and the other located on the opposite side of said valve member, a pair of compressible rubber rings with one each disposed in a said recess to sealingly engage the surface of said valve member on substantially opposite sides thereof.

34. The invention as claimed in claim 33 wherein said transition portion of said bore is a flat wall surface.

35. The invention as claimed in claim 34 wherein said flat wall surface extends at an angle to said longitudinal axis of said bore.

36. The invention as claimed in claim 35 wherein said angle is not less than 45°.

37. The invention as claimed in claim 33 wherein said valve member is a ball shaped element having a through bore and an exterior surface including a recess receiving said one end of said operating member.

38. The invention as claimed in claim 33 wherein said operating member is stainless steel.

39. The invention as claimed in claim 33 wherein said valve member is steel.

40. A valve assembly for carrying a fluid under pressure and comprising a valve housing having a fluid passage therethrough, a valve member rotatably disposed in said passage to be movable between an open position wherein flow through said passage and valve member is permitted and a closed position wherein flow through said passage and valve member is prevented, said valve housing having a bore of a selected diameter and extending along a longitudinal axis, an operating member disposed in said bore with one end thereof operatively engaging said valve member and an opposite end, said bore having an interior portion having a diameter greater than said selected diameter and an annular transition portion extending from said interior portion to said bore of selected diameter with diminishing diameter, said operating member being substantially cylindrical and having a selected length including a first portion having a diameter permitting said first portion to closely interfit with said bore of selected diameter and a second portion comprising an annular convex surface disposed to face said transition portion, said operating member including resilient sealing means for sealingly engaging said bore, said resilient sealing means being located between said opposite end and said second portion of said operating member, said valve housing extending along a longitudinal axis, said passage also extending substantially parallel to said longitudinal axis of said valve housing and being at least partially defined by an interior surface of said valve housing, said valve housing having open opposite ends, said valve assembly including an insert fitting having a through bore and one end inserted in one of said opposite ends, said one end of said fitting provided with an annular recess defined on one side by an annular lip, said interior surface including an annular recess defined on one side by an annular lip and extending about said longitudinal axis of said valve housing, each said recess having a compressible rubber ring carried therein to sealingly engage the surface of said valve member on substantially opposite sides thereof.

41. The invention as claimed in claim 40 wherein said transition portion of said bore is a flat wall surface.

42. The invention as claimed in claim 41 wherein said flat wall surface extends at an angle to said longitudinal axis of said bore.

43. The invention as claimed in claim 42 wherein said angle is not less than 45°.

44. The invention as claimed in claim 40 wherein said valve member is a ball shaped element having a through bore and an exterior surface including a recess receiving said one end of said operating member.

45. The invention as claimed in claim 40 wherein said operating member is stainless steel.

46. The invention as claimed in claim 40 wherein said valve member is steel.

* * * * *